US008078731B1

(12) United States Patent
Bruder et al.

(10) Patent No.: US 8,078,731 B1
(45) Date of Patent: Dec. 13, 2011

(54) USER PROXY SERVER

(75) Inventors: Seth D. Bruder, Santa Monica, CA (US); Jeffrey M. Greif, Venice, CA (US)

(73) Assignee: Webalo, Inc., Santa Monica, CA (US)

( * ) Notice: Subject to any disclaimer, the term of this patent is extended or adjusted under 35 U.S.C. 154(b) by 921 days.

(21) Appl. No.: 11/131,725

(22) Filed: May 17, 2005

Related U.S. Application Data

(60) Provisional application No. 60/572,186, filed on May 17, 2004.

(51) Int. Cl.
*G06F 15/16* (2006.01)
(52) U.S. Cl. ...................................................... 709/227
(58) Field of Classification Search ................... 705/5, 6, 705/1, 28, 26, 27; 709/204, 206–207, 217–219
See application file for complete search history.

(56) References Cited

U.S. PATENT DOCUMENTS

| | | | | |
|---|---|---|---|---|
| 6,237,025 B1 * | 5/2001 | Ludwig et al. | ................ | 709/204 |
| 6,725,252 B1 * | 4/2004 | Himmel et al. | ............... | 709/203 |
| 2002/0054587 A1 * | 5/2002 | Baker et al. | ................... | 370/352 |
| 2002/0087649 A1 * | 7/2002 | Horvitz | ......................... | 709/207 |
| 2002/0111922 A1 * | 8/2002 | Young et al. | .................... | 705/80 |
| 2002/0152222 A1 * | 10/2002 | Holbrook | .................... | 707/104.1 |
| 2003/0060896 A9 * | 3/2003 | Hulai et al. | ....................... | 700/1 |
| 2004/0111424 A1 * | 6/2004 | Roman et al. | ................. | 707/100 |
| 2004/0215700 A1 * | 10/2004 | Shenfield et al. | ............. | 709/201 |
| 2004/0230659 A1 * | 11/2004 | Chase | ........................... | 709/206 |
| 2005/0084087 A1 * | 4/2005 | Rajagopalan et al. | ... | 379/205.01 |

OTHER PUBLICATIONS

Harry Newton, Newton's Telecom Dictionary, 23rd Edition.*

\* cited by examiner

*Primary Examiner* — Kevin Bates
*Assistant Examiner* — Angela Nguyen
(74) *Attorney, Agent, or Firm* — Park, Vaughan, Fleming & Dowler LLP; Laxman Sahasrabuddhe

(57) ABSTRACT

One embodiment of the present invention provides a system that facilitates interacting with a user through a user proxy server. During operation, the system receives a request to interact with the user, wherein the request is received at a user proxy server, which services requests for interactions with users. This request specifies data or data types involved in the user interaction, as well as the purpose of the user interaction, but does not specify details of how the user interaction takes place. In response to this request, the system interacts with the user in a manner which is consistent with context information associated with the user.

34 Claims, 3 Drawing Sheets

USER PROXY SERVER

RELATED APPLICATION

This application hereby claims priority under 35 U.S.C. §119 to U.S. Provisional Patent Application No. 60/572,186 filed on 17 May 2004, entitled "Method and System for Enabling Users to Interact with Computer Systems," by inventors Seth D. Bruder and Jeffrey M. Greif. The instant application hereby incorporates by reference this provisional application.

BACKGROUND

1. Field of the Invention

The present invention relates to techniques for managing interactions between computer applications and computer users. More specifically, the present invention relates to a user proxy server, which provides a mechanism through which computer-based applications can communicate with computer users.

2. Related Art

The application server architecture—which predominates today for delivering applications to mobile devices as well as the desktop—has been developed based on specific assumptions. In times past, an enterprise application may have been expected to be "stand-alone" and accessed from a dedicated terminal. In many cases, it made sense for user interfaces to be hand-built and hard-wired by an application vendor or integrator. Later, the web browser replaced the dedicated terminal as the preferred access method; this was well accommodated by "application servers," which are Web servers fitted with a number of features to support such things as transactions, dynamic content, and programmatic extensions.

Like Web servers, which had been created to broadcast content, the application server architecture entangled the control of the details of the application user interface (the "presentation layer") with the administration of the server. Consequently, certain assumptions were built into the application server architecture. In particular that, as with a dedicated terminal, user interfaces would be created once (or change infrequently) and shared by all users.

Due to a number of factors, these assumptions are no longer valid for many mission-critical applications. Such factors include: the continually increasing importance of computing to business processes; the growing complexity, heterogeneity, and variability of application environments; and especially the advent of multiple access devices (e.g. desktop, PDA, WAP, VXML) and web services. In the modern world, different industries, enterprises, business units, or individuals have different needs (i.e. mission-critical business tasks to perform) in certain application domains. Likewise, their needs now often involve using aspects of several software applications or web services in task-specific combinations on several devices. Furthermore, needs, devices, and applications change.

At present, the relatively few server administrators in an organization are too heavily burdened to provide customized integrated solutions for every evolving need. On the other hand, the only one-size-fits-all solution is a lowest-common-denominator solution, and that common denominator gets lower and lower as the network of users, devices, and services grows. Thus, if one attempts to create a unified user interface with an application server, one ends up with a result where general-purpose (rather than task-specific and personalized) resources or controls are exposed. The user must manually navigate through these resources or controls at runtime to manually extract desired data and must carry information from step to step (i.e. the user must browse).

Hence, what is needed is a method and an apparatus that enables an application to interact with a user without suffering from the above-described problems.

SUMMARY

One embodiment of the present invention provides a system that facilitates interacting with a user through a user proxy server. During operation, the system receives a request to interact with the user, wherein the request is received at a user proxy server, which services requests for interactions with users. This request specifies data or data types involved in the user interaction, as well as the purpose of the user interaction, but does not specify details of how the user interaction takes place. In response to this request, the system interacts with the user in a manner which is consistent with context information associated with the user.

In a variation on this embodiment, interacting with the user can involve: obtaining data from the user; presenting data to the user; receiving a selection of an option from the user; and receiving a confirmation of an action from the user.

In a variation on this embodiment, interacting with the user can involve: receiving a response from the user; and returning a corresponding response to the requester.

In a variation on this embodiment, the context information associated with the user can include: user preferences; other activities that the user is associated with; history information associated with the user; and characteristics of a device through which the user interacts with the user proxy server.

In a variation on this embodiment, the request can affect an earlier request, for example by updating or canceling the earlier request.

In a variation on this embodiment, receiving the request involves prioritizing the request and placing the request in a queue of requests.

In a variation on this embodiment, interacting with the user can involve interacting with the user in an asynchronous manner, wherein if the user is unavailable, the interaction takes place at a later time when the user becomes available.

In a variation on this embodiment, interacting with the user involves interacting with the user through a Task-oriented interface, wherein the Task-oriented interface presents a set of Tasks to the user, wherein the Tasks are applications that correspond to web services operations.

In a variation on this embodiment, the system interacts with the user through a "pudgy client," wherein the pudgy client is configured to interact with the user in a device-specific manner, thereby taking advantage of the capabilities of the user's device. (Note that pudgy clients are described in more detail below.)

DETAILED DESCRIPTION

Figure 1:
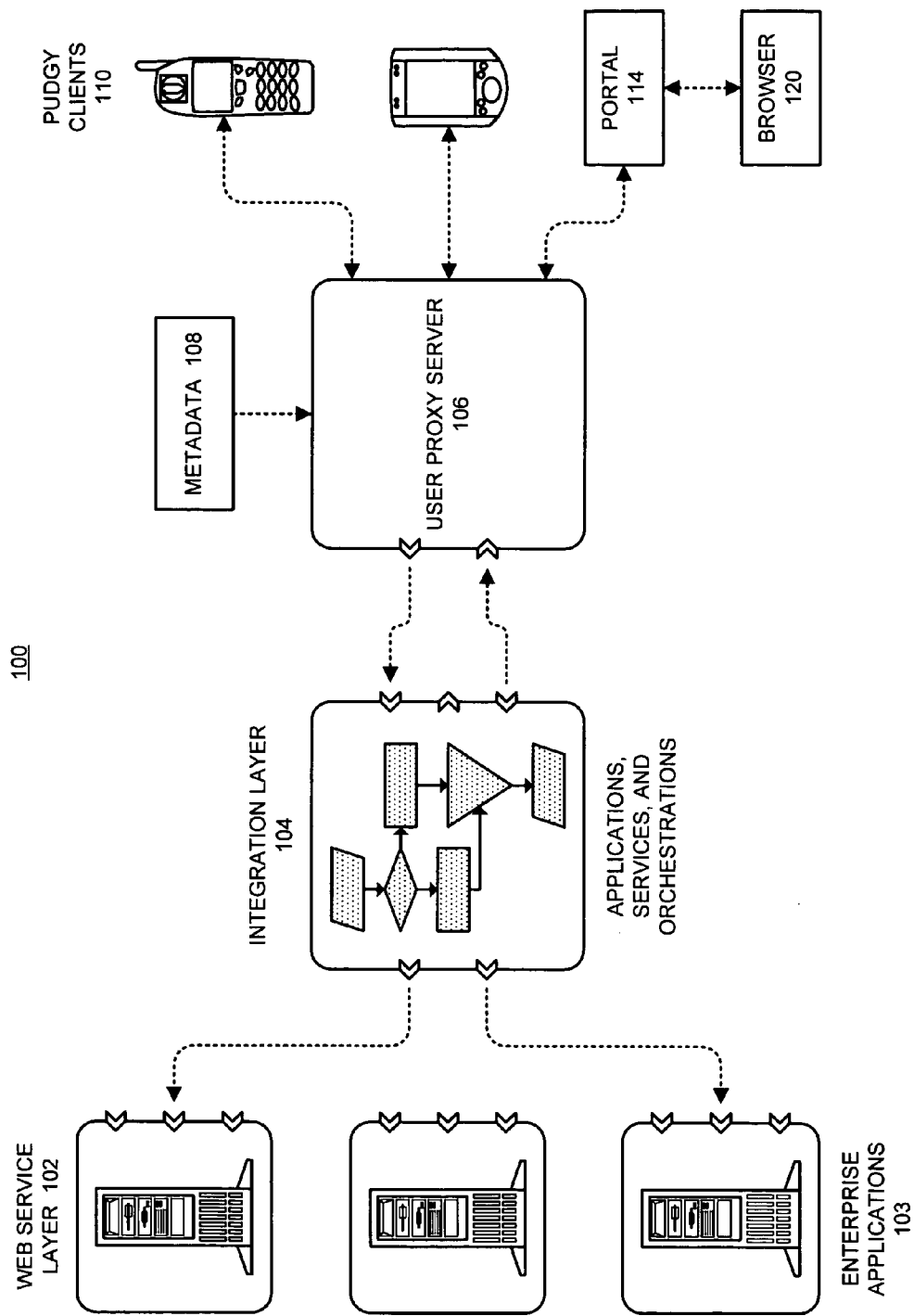
FIG. 1 illustrates a distributed computing system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Web Services

Existing web services technologies provide a set of standards and technologies for performing distributed computing—enabling systems to talk to each other over a network. More specifically, existing Web services provide: (1) standards-based interfaces to applications (including legacy applications and new applications); (2) security and management of services; and, (3) orchestration of services, thereby enabling the composition of Web services into "composite applications" (a.k.a., "business processes").

Web services can be thought of as an industry-wide re-tooling phenomenon. The point is to achieve dramatically lower costs, rapid deployment, and more flexible systems.

Note that existing Web services and associated composite application technologies, provide only a partial solution—they provide the "application-to-application" part of the solution.

For user-facing applications, the conventional approach is to build a web site on top of services, or to build custom clients for applications. However, this defeats the value proposition otherwise associated with Web services. Building user interfaces in this way is time-consuming and produces an inflexible result. Furthermore, if you want to add/remove/change an underlying service—something made relatively easy by Web services—you have to do costly work on the UI.

User Proxy Server

The User Proxy Server (UPS) delivers an "application-to-user" solution that yields the same benefits as Web services do for the "application-to-application" part of the problem—rapid deployment and dramatically increased flexibility. To do so, the "User Proxy Server" (UPS): (1) enables users to directly invoke Web service operations; and (2) provides a Web service that applications and other services can call in order to interact with the user. In this way, the UPS effectively "turns the user into a Web service." This enables a developer to use standardized back-end infrastructure (such as infrastructure for building "composite applications" comprised of other services) to build user-facing applications.

An important insight behind the invention of the User Proxy Server is that user interactions (including not just user interfaces but the timing, ordering, and prioritization of interactions, among other things) can be generated programmatically based on descriptions of services (e.g., WSDL documents), data (e.g., XML data) and meta-data (semantic information about the data), context (time, location of user, recent history of user transactions, current interactions with the user), device info, etc.

One embodiment of the present invention facilitates implementing a Web service as a user-facing "Task." This provides significant advantages because it enables communications between applications and users to be orchestrated using Business Process Execution Language (BPEL) and described using Web Services Description Language (WSDL).

For example, FIG. 1 illustrates a distributed computing system 100 in accordance with an embodiment of the present invention. Distributed computing system 100 includes a web services layer 102 that provides a number of enterprise applications 103. This web services layer communicates with an integration layer 104, which combines capabilities of the enterprise applications 103 to provide different combinations of applications, services and orchestrations to a number of user devices on the right-hand side of FIG. 1. For example, these user devices can include pudgy clients 110, or a browser which is accessed through a portal 114.

Interactions between various applications, services and orchestrations and the user devices are intermediated by User Proxy Server (UPS) 106. In one embodiment of the present invention, the UPS 106 provides two interfaces: (1) a Web Services Interface for applications, and (2) a User Interface for users. In this way, UPS 106 can serve as an intermediary layer between a company's existing Web services infrastructure and user devices, such as a user's handheld device.

The UPS does two things. (1) It displays, to the user, an interface which allows the user to invoke "Tasks," wherein Tasks are in fact Web services—i.e., the UPS enables the user to initiate interactions with back-end applications. (2) It also processes requests (specifically, Web service requests) from applications for interaction with the user—things like getting information from a user or showing information to a user—and then generates an interface and interacts with the user on the application's behalf. Moreover, the requests can be handled "asynchronously," with the interaction with the user occurring long after the request is made.

The UPS architecture provides a number of advantages. (1) It allows applications and services to be built without specifying user interfaces, or worrying about user preferences, devices, or connectivity. (2) By using a UPS, it is possible to provide support for new user devices or change existing interfaces, without changing the underlying applications or services. Together these advantages translate to the higher-level advantages of "rapid deployment and dramatically increased flexibility."

User Interface

The UPS dynamically integrates Web services to create a "Task-oriented" user-experience. In doing so, the UPS presents a picture of the Web services world in which the user is able to run narrowly focused applications—that the user may think of as "Tasks" that correspond (behind the scenes) to Web services operations defined in WSDL documents. Some of these operations perform specific business tasks with only a few interactive steps, such as placing a purchase order, getting customer service histories, or rescheduling a delayed shipment. Others involve extensive user interaction, such as diagnosing a technical problem or coordinating and servicing a business meeting.

The UPS presents a unified user experience by dynamically binding Tasks together using contextual information (which, for example, is represented as metadata 108 in FIG. 1). Information about the user's interactions is collected and used to generate context-sensitive menus of Tasks and to pre-populate inputs to them.

This "Task-oriented" approach provides several important benefits. Because Tasks correspond to Web service operations, operations may be loosely coupled. The system of Tasks is highly flexible, allowing Tasks to be created and changed as needs and systems change. Further, the Task-oriented approach is distinctive in that it scales well from very limited devices to rich windowing devices.

Figure 2:
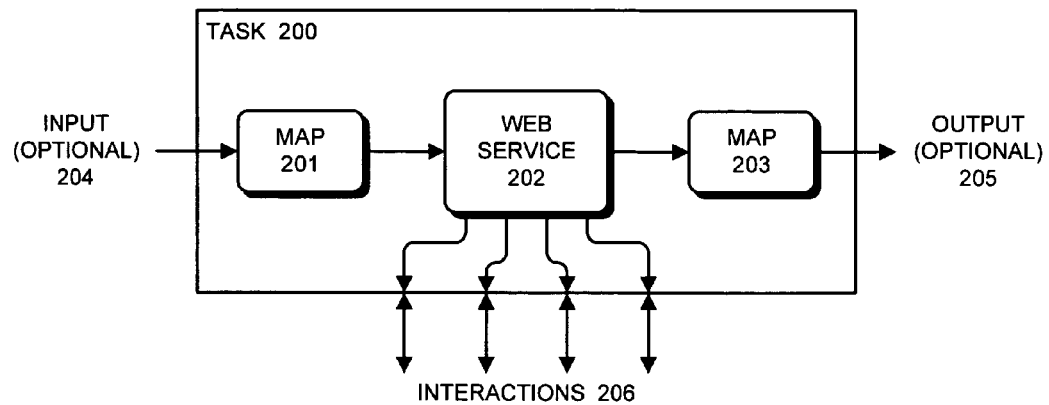
FIG. 2 illustrates the structure of a Task in accordance with an embodiment of the present invention.

Referring to FIG. 2, a Task 200 is an entity which can be presented to a user through a Task-oriented user interface. Task 200 can be thought of as a wrapper around a Web service 202. Note that Task 200 can optionally receive one or more inputs 204. These inputs 204 feed through a map 201, which performs translation operations, before the input is passed along to Web service 202. When a user runs a Task 200, and enters inputs 204 if required, the corresponding Web service 202 is invoked. The Web service 202, and therefore the Task, may be synchronous (completed while the user waits), or asynchronous and long running (perhaps taking hours or days to complete). Outputs from Web service 202 feed through another map 203 that performs translations to generate optional output from Task 200. While it is running, The Web service 202, that corresponds to Task 200, may also invoke the User Proxy Service (Web service provided by the UPS) to request interactions 206 with the user. The nature of interactions 206 may depend on the specific properties of the request, configuration of the UPS, and the user's context. For example, the interactions can depend upon: data presented or requested; data types, such as XML Schema types; and metadata, such as semantic information about fields of said datatypes (which could be enumerated itself).

Although the terms "Task" and "Task instance" are sometimes used interchangeably throughout this specification, these terms actually refer to slightly different but related things. The term a "Task" refers to an abstraction, which has no concrete form until it is instantiated into a specific "Task instance," which can perform various "interactions" with the user.

Web Services Interface

The UPS enables applications to easily interact with the user without having to worry about user interfaces, context, preferences, devices, or even whether the user is connected. The UPS automatically handles these complex issues. To make this possible, the UPS provides an "always-on" Web service—a user "proxy" service. An application calls this service to request an interaction with the user. The request is "abstract" in that it does not need to specify the details of how the interaction is to be carried out. It only specifies the data (e.g., in the present embodiment, XML data), or types of data (e.g., XML Schema), to be transacted and the semantic significance of the transaction. For example, an application might request that the user be alerted to a fact, be shown a piece of data, be asked to provide data of a specified type, be asked to select from among some number of options, or be asked to confirm an action.

Note that the above-described operations are the types of interactions with the user that are required in a Workflow. This is how the UPS enables Workflows to be built using the Web services composite application technology.

On behalf of the user (i.e., as a proxy for the user), the UPS prioritizes and processes these requests for interaction, communicating with the user separately through the user's Task-oriented user interface in accordance with his or her preferences (and the user's current context, which is defined in more detail below). Because the requests are in abstract form, the UPS is completely free to queue them, format them, deliver them, and fulfill them as appropriate.

In this way, the UPS works in stark contrast to alternative approaches to building or generating user-facing applications and yields dramatically more rapid deployment and flexibility. This approach is unique in that it enables the use of standards-based tools and pervasive orchestration technology (such as BPEL4WS or WSCI) to easily wire users directly into complex business processes.

Note that a fundamental concept behind the UPS is "separation of concerns." A portion of the system interacts with applications and services (the "Services Management Layer"), and another portion interacts with users and their devices (the "Device Management Layer"). A middle portion, called the "Interaction Abstraction Layer" (IAL), in effect, translates between the two.

Note that "separation of concerns" is more than simply a division of labor between components. All the application developer has to do is to transact data and meta-data (types and semantic information) with the UPS. The UPS takes care of the rest; the data, the meta-data, and information about the user's context, device, etc., are sufficient to generate the interfaces.

Users Devices

The UPS facilitates seamless access to applications across a wide range of devices using both XHTML-compatible browsers and, optionally, specific client-side software. XHTML support enables easy access from thin clients and other platforms where installation of client-side software is not appropriate. The XHTML interface can be run from any Web browser.

Note that because the application and UPS configuration only specifies data and semantic metadata, the UPS, having information about the user's context and device, is free to generate interactions which are finely tuned to the device the user is using. This facilitates making the XHTML as good as possible and making pudgy clients look like custom applications, even though there is no application-specific user-interface code.

One embodiment of the present invention additionally provides client-side software for selected PDA and phone operating systems, such as Pocket PC and Palm OS. This client-side software can provide the advantages of custom clients (native look-and-feel, extended security, and offline functionality) without the need to upload new clients for new applications; the application-specific functionality can be uploaded or updated dynamically from the server.

This client-side software can run on the user's device and can provide a native look and feel, offline functionality, and advanced security. At the same time, no application-specific functionality is built into the client-side software—all application-specific functionality is dynamically uploaded from the server. The content uploaded from the server, in essence, specifies data, as well as explicit specifications of a set of "frames" (screens) and how the frames are supposed to link to each other. This means that the user's environment can be changed without changing the software on the device, and without compromising things like offline functionality.

User Proxy Server

Figure 3:
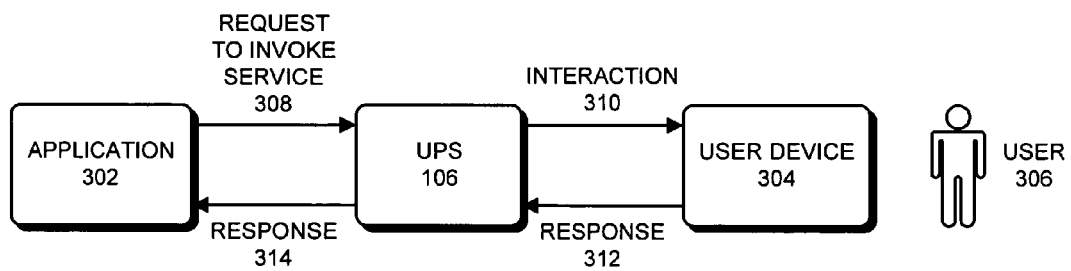
FIG. 3 illustrates how an application interacts with a user through a user proxy server in accordance with an embodiment of the present invention.

FIG. 3 illustrates how an application interacts with a user through a User Proxy Server in accordance with an embodiment of the present invention. In FIG. 3, an application, such as a web services client sends a request to invoke a service 308 to User Proxy Server (UPS) 106. In response to this request, UPS 106 communicates with user device 304 to interact with user 306.

Some types of interactions elicit a response from user 306, and this response passes from user device 304 to UPS 106. UPS 106 then forwards the response to application 302.

User Interaction

Figure 4:
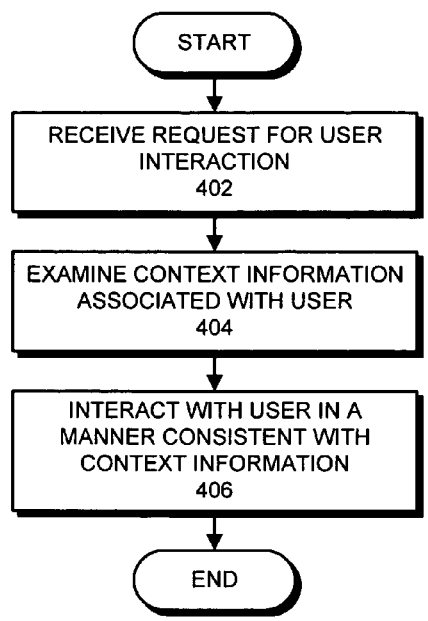
FIG. 4 presents a flow chart illustrating how a user proxy server facilitates an interaction with a user in accordance with an embodiment of the present invention.

FIG. 4 presents a flow chart illustrating how a User Proxy Server facilitates an interaction with a user in accordance with an embodiment of the present invention. First, UPS 106 receives a request 308 for a user interaction (step 402). This request specifies data or data types involved in the user interaction as well as the purpose of the user interaction, but does not specify details of how the user interaction takes place.

Next, UPS 106 examines context information associated with the user (step 404). For example, this context information can include: user preferences; other activities that the user is associated with; history information associated with the user; and characteristics of a device through which the user interacts with the User Proxy Server.

UPS 106 then interacts with the user in a manner consistent with this context information (step 406). For example, this interaction can involve: obtaining data from the user; presenting data to the user; receiving a selection of an option from the user; and receiving a confirmation of an action from the user.

More Details

Figure 5:
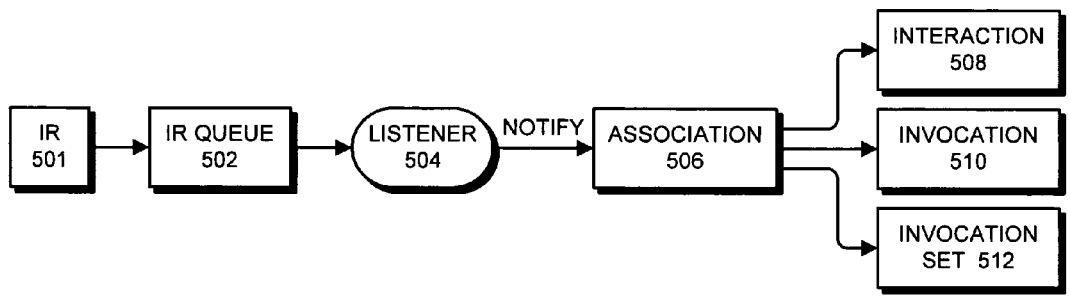
FIG. 5 illustrates various mechanisms involved in the facilitating and interaction with a user in accordance with an embodiment of the present invention.

FIG. 5 illustrates some of the inner workings of UPS 106. When UPS 106 receives an interaction request (IR) 501, the interaction request is prioritized and places in IR queue 502.

Requests may be executed, conditionally or unconditionally. For example, a given request might: cancel a previous request; get status information about a previously executed request; transform data produced by a previously executed request; send or receive information from a database or server system; specify a user interaction, such as providing output to a user or receiving input from a user; or determine which request should next be executed.

In one embodiment of the present invention, if the request is to perform an interaction with a user, the interaction can involve a number of "instructions." For example, these instructions can: get information from the user; show information to the user; receive a selection of an option from the user; and can get a confirmation of an action from the user. Note that instructions can refer to earlier instructions and can also refer to specific Task invocations.

Next, when the Task is enqueued, a listener 504 associated with IR queue 502 can send a notification regarding the new IR 501 to an association mechanism 506. Association mechanism 506 can then associate the new IR 501 with: an interaction object 508; a Task invocation object 510; or an invocation set 512, which creates a Task invocation if the IR is associated with a Task but an invocation does not yet exist. If no Task is associated with the IR, the IR can be associated with a default Task. Next, the above-described objects get notified of the IR, which enables the objects to perform an associated action.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for an application to interact with a user at a client device through a user proxy server (UPS) system, the method comprising:

receiving, at the UPS system, an interaction request from the application to initiate interactions with the user, wherein the interaction request specifies data, data types, and/or semantic metadata for interacting with the user;

processing, at the UPS system, the interaction request and contextual information existing at the UPS system, wherein the processing comprises:

creating, based on the data, data types, and/or semantic metadata, a hierarchy of graphical user interface (GUI) components to interact with the user and behavior managers for handling events associated with the GUI components; and providing the hierarchy of GUI components and the behavior managers to the client device; and the UPS system interacting with the user at the client device in a manner that is consistent with the contextual information, wherein said interacting is asynchronous and uses the hierarchy of GUI components and the behavior managers.

2. The method of claim 1, wherein interacting with the user can involve:

obtaining data from the user;
presenting data to the user;
receiving a selection of an option from the user; and
receiving a confirmation of an action from the user.

3. The method of claim 1, wherein interacting with the user involves:

receiving a response from the user at the client device; and
returning a corresponding response to the requesting application.

4. The method of claim 1, wherein the contextual information existing at the UPS system includes:

user preferences;
other activities that the user is associated with;
history information associated with the user; and
characteristics of a device through which the user interacts with the UPS system.

5. The method of claim 1, wherein the interaction request affects an earlier interaction request.

6. The method of claim 5, wherein affecting the earlier interaction request involves updating or canceling the earlier interaction request.

7. The method of claim 1, wherein receiving the interaction request involves prioritizing the interaction request and placing the interaction request in a queue of interaction requests.

8. The method of claim 1, wherein interacting with the user involves interacting with the user in an asynchronous manner, wherein if the user is unavailable, the interaction takes place at a later time when the user becomes available.

9. The method of claim 1, wherein interacting with the user involves interacting with the user through a task-oriented interface;
wherein the task-oriented interface presents a set of tasks to the user; and
wherein the tasks are applications that correspond to web services operations.

10. The method of claim 1, wherein interacting with the user involves interacting with the user through a pudgy client;
wherein the pudgy client is configured to interact with the user in a device-specific manner, thereby taking advantage of the capabilities of the client device through which the user interacts with the UPS system.

11. A non-transitory computer-readable storage device storing instructions that, when executed by a computer, cause the computer to perform a method for an application to interact with a user at a client device through the computer, the method comprising:
  receiving an interaction request from the application to initiate interactions with the user, wherein the interaction request specifies data and/or data types, and semantic metadata for interacting with the user;
  processing the interaction request and contextual information existing at the computer, wherein the processing comprises:
    creating, based on the data, data types, and/or semantic metadata, a hierarchy of graphical user interface (GUI) components to interact with the user and behavior managers for handling events associated with the GUI components; and
    providing the hierarchy of GUI components and the behavior managers to the client device; and
  interacting with the user at the client device in a manner that is consistent with the contextual information, wherein said interacting is asynchronous and uses the hierarchy of GUI components and the behavior managers.

12. The non-transitory computer-readable storage device of claim 11, wherein interacting with the user can involve:
  obtaining data from the user;
  presenting data to the user;
  receiving a selection of an option from the user; and
  receiving a confirmation of an action from the user.

13. The non-transitory computer-readable storage device of claim 11, wherein interacting with the user involves:
  receiving a response from the user; and
  returning a corresponding response to the user.

14. The non-transitory computer-readable storage device of claim 11, wherein the contextual information existing at the computer includes:
  user preferences;
  other activities that the user is associated with;
  history information associated with the user; and
  characteristics of a device through which the user interacts with the computer.

15. The non-transitory computer-readable storage device of claim 11, wherein the interaction request affects an earlier interaction request.

16. The non-transitory computer-readable storage device of claim 15, wherein affecting the earlier interaction request involves updating or canceling the earlier interaction request.

17. The non-transitory computer-readable storage device of claim 11, wherein receiving the interaction request involves prioritizing the interaction request and placing the interaction request in a queue of interaction requests.

18. The non-transitory computer-readable storage device of claim 11, wherein interacting with the user involves interacting with the user in an asynchronous manner, wherein if the user is unavailable, the interaction takes place at a later time when the user becomes available.

19. The non-transitory computer-readable storage device of claim 11,
  wherein interacting with the user involves interacting with the user through a task-oriented interface;
  wherein the task-oriented interface presents a set of tasks to the user; and
  wherein the tasks are applications that correspond to web services operations.

20. The non-transitory computer-readable storage device of claim 11,
  wherein interacting with the user involves interacting with the user through a pudgy client;
  wherein the pudgy client is configured to interact with the user in a device-specific manner, thereby taking advantage of the capabilities of the client device through which the user interacts with the computer.

21. An apparatus for facilitating an application to interact with a user at a client device, the apparatus comprising:
  a processor; and
  a non-transitory computer-readable storage medium storing instructions that, when executed by the processor, cause the apparatus to perform a method comprising:
    receiving an interaction request from the application to initiate interactions with the user, wherein the interaction request specifies data and/or data types, and semantic metadata for interacting with the user;
    processing the interaction request and contextual information existing at the apparatus, wherein the processing comprises:
      creating, based on the data, data types, and/or semantic metadata, a hierarchy of graphical user interface (GUI) components to interact with the user and behavior managers for handling events associated with the GUI components; and
      providing the hierarchy of GUI components and the behavior managers to the client device; and
    interacting with the user at the client device in a manner that is consistent with the contextual information, wherein said interacting is asynchronous and uses the hierarchy of GUI components and the behavior managers.

22. The apparatus of claim 21, wherein interacting with the user can involve:
  obtaining data from the user;
  presenting data to the user;
  receiving a selection of an option from the user; and
  receiving a confirmation of an action from the user.

23. The apparatus of claim 21, wherein interacting with the user involves:
  receiving a response from the user; and
  returning a corresponding response to the requesting application.

24. The apparatus of claim 21, wherein the contextual information existing at the proxy server includes:
  user preferences;
  other activities that the user is associated with;
  history information associated with the user; and
  characteristics of a device through which the user interacts with the apparatus.

25. The apparatus of claim 21, wherein the interaction request affects an earlier interaction request.

26. The apparatus of claim 25, wherein affecting the earlier interaction request involves updating or canceling the earlier interaction request.

27. The apparatus of claim 21, wherein after receiving the interaction request, the user proxy server is configured to prioritize the interaction request and place the interaction request in a queue of interaction requests.

28. The apparatus of claim 21, wherein interacting with the user involves interacting with the user in an asynchronous manner, wherein if the user is unavailable, the interaction takes place at a later time when the user becomes available.

29. The apparatus of claim 21,
  wherein interacting with the user involves interacting with the user through a task-oriented interface;
  wherein the task-oriented interface presents a set of tasks to the user; and
  wherein the tasks are applications that correspond to web services operations.

30. The apparatus of claim 21,
wherein interacting with the user involves interacting with the user through a pudgy client;
wherein the pudgy client is configured to interact with the user in a device-specific manner, thereby taking advantage of the capabilities of the client device through which the user interacts with the apparatus.

31. The method of claim 1,
wherein the UPS acts on behalf of the user without requiring the user's interaction.

32. The non-transitory computer-readable storage medium of claim 11,
wherein the computer acts on behalf of the user without requiring the user's interaction.

33. The apparatus of claim 21,
wherein the apparatus acts on behalf of the user without requiring the user's interaction.

34. A method for an application to interact with a user at a client device through a user proxy server (UPS) system, wherein the UPS comprises a services management layer (SML), an interaction abstraction layer (IAL), and a device management layer (DML), the method comprising:
receiving, at the SML, an abstract interaction request from the application to initiate interactions with the user, wherein the abstract interaction request specifies data, data types, and/or semantic metadata for interacting with the user;
the SML queuing the abstract interaction request in an interaction request queue;
the SML providing information contained in the abstract interaction request to the IAL;
the IAL creating, based on the information contained in the abstract interaction request and contextual information existing at the UPS system, a hierarchy of graphical user interface (GUI) components to interact with the user and behavior managers for handling events associated with the GUI components;
the IAL providing the hierarchy of GUI components and the behavior managers to the DML;
the DML using the hierarchy of GUI components and the behavior managers to asynchronously interact with the user, wherein said asynchronous interaction is performed through the client device in a manner that is consistent with the contextual information.

* * * * *